(12) United States Patent
Ri (10) Patent No.: US 7,345,816 B2
(45) Date of Patent: Mar. 18, 2008

(54) OPTICAL MICROSCOPE

(75) Inventor: Sei Ri, Tokyo (JP)

(73) Assignee: Olympus Corporation, Tokyo (JP)

( * ) Notice: Subject to any disclaimer, the term of this patent is extended or adjusted under 35 U.S.C. 154(b) by 14 days.

(21) Appl. No.: 11/323,573

(22) Filed: Dec. 30, 2005

(65) Prior Publication Data
US 2006/0152799 A1    Jul. 13, 2006

(30) Foreign Application Priority Data
Jan. 11, 2005    (JP) .............................. 2005-004025

(51) Int. Cl.
*G02B 21/06* (2006.01)

(52) U.S. Cl. ...................... 359/388; 359/223; 359/224; 359/726

(58) Field of Classification Search ................ 359/388, 359/223, 726, 224, 364
See application file for complete search history.

(56) References Cited

U.S. PATENT DOCUMENTS

| | | | |
|---|---|---|---|
| 4,827,125 A | 5/1989 | Goldstein et al. | |
| 5,062,715 A | 11/1991 | Nakata et al. | |
| 6,094,300 A | 7/2000 | Kashima et al. | |
| 6,751,016 B2 | 6/2004 | Fukuyama et al. | |
| 6,771,417 B1 | 8/2004 | Wolleschensky et al. | |
| 6,909,542 B2 | 6/2005 | Sasaki | |
| 7,034,270 B2 | 4/2006 | Sasaki | |
| 7,057,806 B2 | 6/2006 | Atkinson | |
| 2001/0009473 A1 | 7/2001 | Ogino | |
| 2003/0067607 A1 | 4/2003 | Wolleschensky et al. | |
| 2003/0107789 A1* | 6/2003 | Hishioka | 359/223 |
| 2003/0197924 A1 | 10/2003 | Nakata | |
| 2004/0184163 A1* | 9/2004 | Nishioka et al. | 359/726 |
| 2005/0122579 A1 | 6/2005 | Sasaki | |
| 2006/0239324 A1* | 10/2006 | Akagawa et al. | 372/99 |
| 2007/0007428 A1 | 1/2007 | Ri | |

FOREIGN PATENT DOCUMENTS

| | | |
|---|---|---|
| DE | 101 50 934 A1 | 4/2003 |
| JP | 11-101942 A | 4/1999 |
| JP | 2005-157146 A | 6/2005 |
| JP | 2005-352034 A | 12/2005 |

* cited by examiner

*Primary Examiner*—Joshua L Pritchett
(74) *Attorney, Agent, or Firm*—Frishauf, Holtz, Goodman & Chick, P.C.

(57) ABSTRACT

An optical microscope includes a light source which irradiates a sample with illuminating light. A mirror, which has a variable reflection surface, reflects the illuminating light. A correction table stores plural data of plural shapes of the reflection surface which correspond to changes in a focal position and an aberration. A controller selects, from the plural data stored in the correction table, data of one of the shapes of the reflection surface that is suitable for correcting the focal position and the aberration. And the controller controls the mirror so that the reflection surface forms the shape corresponding to the selected data.

19 Claims, 7 Drawing Sheets

OPTICAL MICROSCOPE

CROSS-REFERENCE TO RELATED APPLICATIONS

This application is based upon and claims the benefit of priority from Japanese Patent Application No. 2005-004025, filed Jan. 11, 2005, the entire contents of which are incorporated herein by reference.

BACKGROUND OF THE INVENTION

1. Field of the Invention

The present invention relates to an optical microscope that allows an observation of a light emitted by a sample with an illuminating light from a light source irradiating the sample.

2. Description of the Related Art

Conventionally, an optical microscope has been widely used, by which a light emitted by a sample is observed with an illuminating light irradiating the sample. Generally, to obtain a clear image of a sample, i.e., an image on which an objective lens is in focus, it is necessary to keep an objective lens and the sample located at a certain distance therebetween. However, a thermal drift or a variety in thickness of a cover glass covering the sample would cause changes in the distance between the objective lens and the sample, resulting in changes in a focal position and an aberration, thus making it impossible to obtain a clear image. To solve this inconvenience, a mechanical adjustment has been generally employed for corrections of the focal position and aberration. However, since a correction collar for the mechanical adjustment is attached to the objective lens, manipulation of this correction collar is so uneasy that a lot of efforts are necessary, especially when the thickness of the cover glass varies. As a technique to correct the focal position and the aberration without using the mechanical adjustment, an optical microscope using an adaptive optical unit for modulating a wave surface of an incoming light is disclosed (See U.S. Pat. No. 6,771,417, for example).

SUMMARY OF THE INVENTION

An optical microscope according to one aspect of the present invention includes a light source irradiating a sample with an illuminating light; a mirror having a variable reflection surface for reflecting the illuminating light; a correction table storing data of plural shapes of the reflection surface which correspond to changes in a focal position and an aberration; and a controller selecting from the plural shapes of the reflection surface a reflection surface suitable for corrections of the focal position and aberration, and controlling the mirror so that the selected reflection surface is formed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
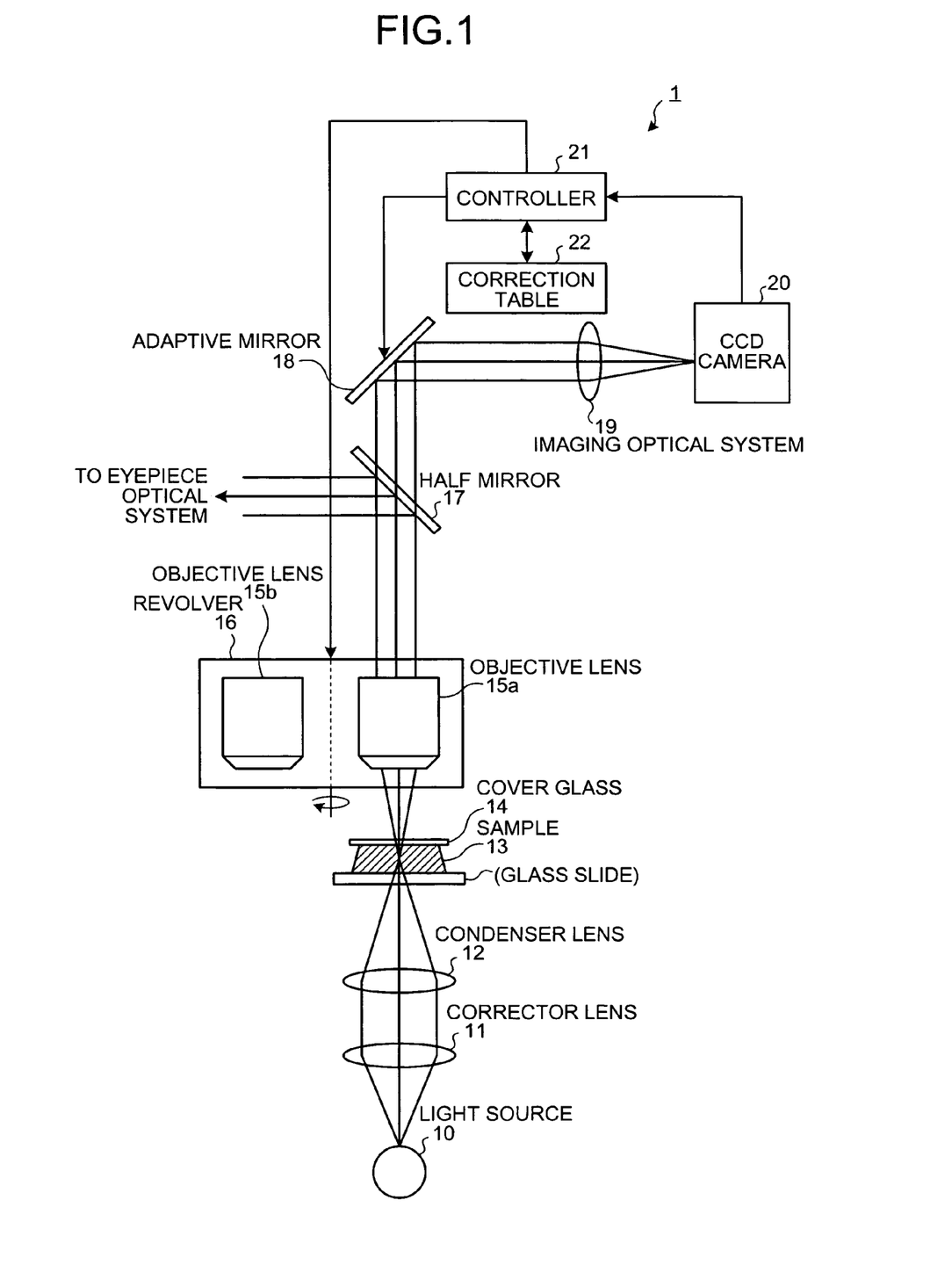
FIG. 1 is a block diagram showing a schematic structure of an optical microscope according to a first embodiment of the present invention.

FIG. 1 is a block diagram showing a schematic structure of an optical microscope 1 according to a first embodiment of the present invention. As shown in FIG. 1, the optical microscope 1 includes a light source 10 that emits an illuminating light; a collector lens that converts an illuminating light to a parallel light; a condenser lens 12 that focuses a parallel-converted illuminating light on a sample 13; an objective lens 15a that receives, via a cover glass 14, a light emitted by the sample 13 on which the illuminating light is focused; a revolver 16 that stores plural objective lenses 15a and 15b; a half mirror 17 that splits the parallel illuminating light converted by the objective lens 15a; an adaptive mirror 18 that variably forms its reflection surface to reflect the light having passed through the half mirror 17; an imaging optical system 19 that focuses the light reflected by the adaptive mirror 18; a CCD camera 20 that obtains an observation image via an optical electronic conversion of the light focused by the imaging optical system 19; a controller 21 that controls the adaptive mirror 18 based on the light volume of the observation image obtained by the CCD camera 20 to change the shape of the reflection surface; and a correction table 22 that stores a plurality of voltage patterns to be applied to the adaptive mirror 18. The controller 21 not only controls an arrangement of the objective lenses 15a and 15b by rotating the revolver 16, but also reads the voltage pattern stored in the correction table 22, and applies the read voltage pattern to the adaptive mirror 18.

In general, the adaptive mirror 18 includes at least one electrode, and an application of voltage to the electrode allows a change in the shape of the reflection surface. With such a change in the shape of the reflection surface, a focal position of the objective lens 15a changes. As a result, when the focal position changes due to an occurrence of a thermal drift or when an aberration changes due to a change in the thickness of the cover glass 14, the changed focal position and aberration can be corrected by changing the shape of the reflection surface of the adaptive mirror 18.

Figure 2:
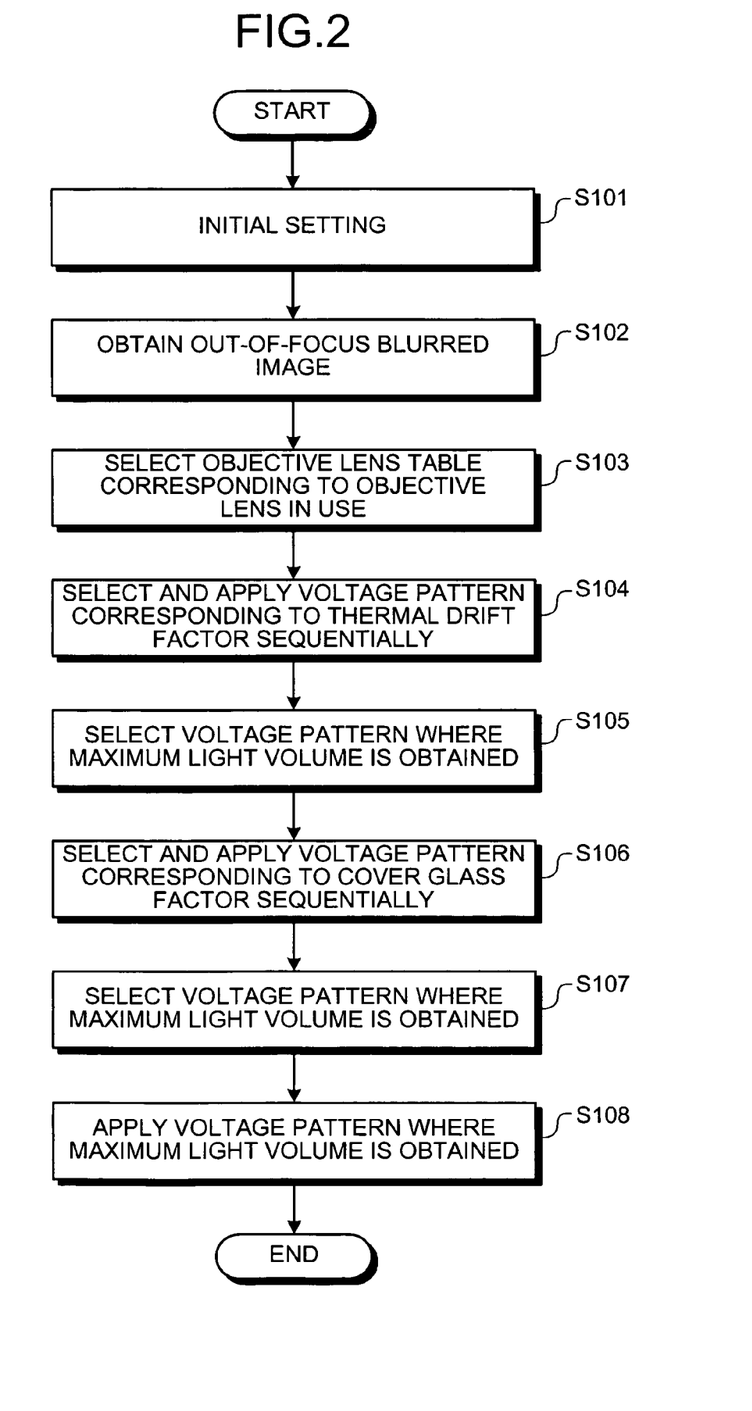
FIG. 2 is a flowchart showing an operation procedure for corrections of a focal position and an aberration performed by a controller according to the first embodiment of the present invention.
Figure 3:
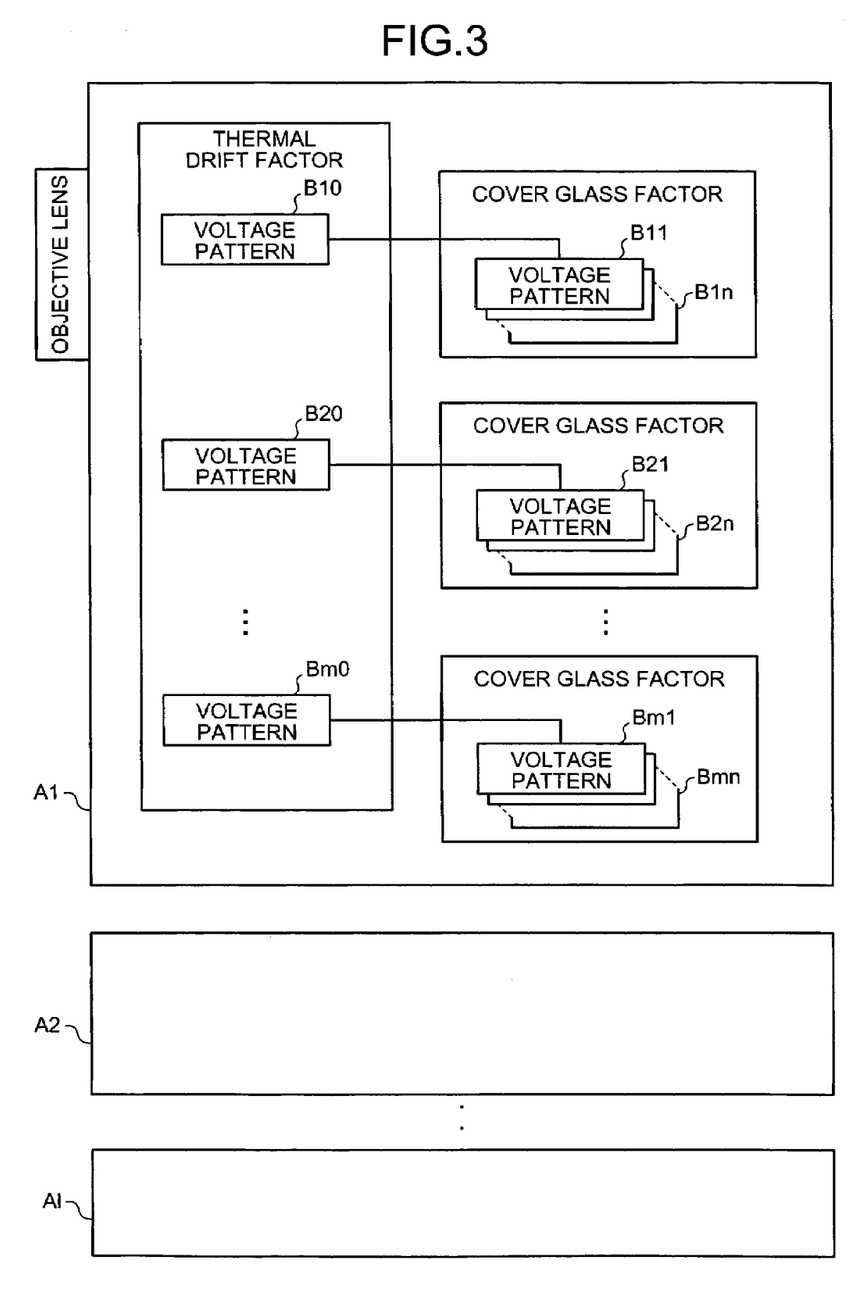
FIG. 3 is a schematic diagram showing a table structure stored in a correction table according to the first embodiment of the present invention.

With reference to FIGS. 2 and 3, an operation procedure of corrections of the focal position and aberration performed by the controller 21 will be described. FIG. 2 is a flowchart showing the operation procedure of the controller 21. First, the controller 21 performs an initial setting, which is a normal setting for optical system of the optical microscope 1 (step S101). After the initial setting, the controller 21 starts an observation of the sample 13. When an out-of-focus blurred image is obtained during the observation (step S102), the controller 21 selects, from the correction table 22, an objective lens table corresponding to the objective lens 15 currently used by the optical microscope 1 (step S103).

FIG. 3 is a schematic diagram showing a table structure stored in the correction table 22. As shown in FIG. 3, the correction table 22 contains objective lens tables A1 to Al each of which contains voltage patterns B10 to Bm0 each corresponding to a thermal drift factor. Each of those voltage patterns B10 to Bm0 contains voltage patterns B11 to B1$n$, B21 to B2$n$, ..., Bm1 to Bmn, each corresponding to a cover glass factor.

The voltage patterns B10 to Bm0 each corresponding to the thermal drift factor represent voltage patterns used for corrections of the changed focal position and aberration when the focal position and aberration changes due to the thermal drift factor. The voltage patterns B11 to B1$n$, B21 to B2$n$, ..., Bm1 to Bmn each corresponding to the cover glass factor represent voltage patterns used for corrections of the changed focal position and aberration when the focal position and aberration changes due to a cover glass factor, i.e., a variety in the thickness of the cover glass 14.

Generally, the degree of changes in the focal position and aberration due to the thermal drift factor is higher than that due to the cover glass factor. Accordingly, the degree of changes in a voltage value corresponding to the thermal drift factor becomes higher than that corresponding to the cover glass factor.

After selecting an objective lens table corresponding to the objective lens currently used in the optical microscope 1, the controller 21 selects voltage patterns B10 to Bm0 that correspond to the thermal drift factor and stored in the selected objective lens table, and sequentially applies them to the adaptive mirror 18 (step S104). After that, the controller 21 selects the voltage pattern where maximum light volume is obtained among the voltage patterns B10 to Bm0 (step S105). When the voltage pattern B10 is selected, for example, the controller 21 selects the voltage patterns B11 to B1$n$ corresponding to the cover glass factor and sequentially applies them to the adaptive mirror 18 (step S106). Next, the voltage pattern where maximum light volume is obtained is selected among the voltage patterns B11 to B1$n$ (step S107). When the voltage pattern B11 is selected, for example, the controller 21 applies the voltage pattern B11 to the adaptive mirror 18 (step S108). Here ends the correction operation for the focal position and aberration.

Figure 4:
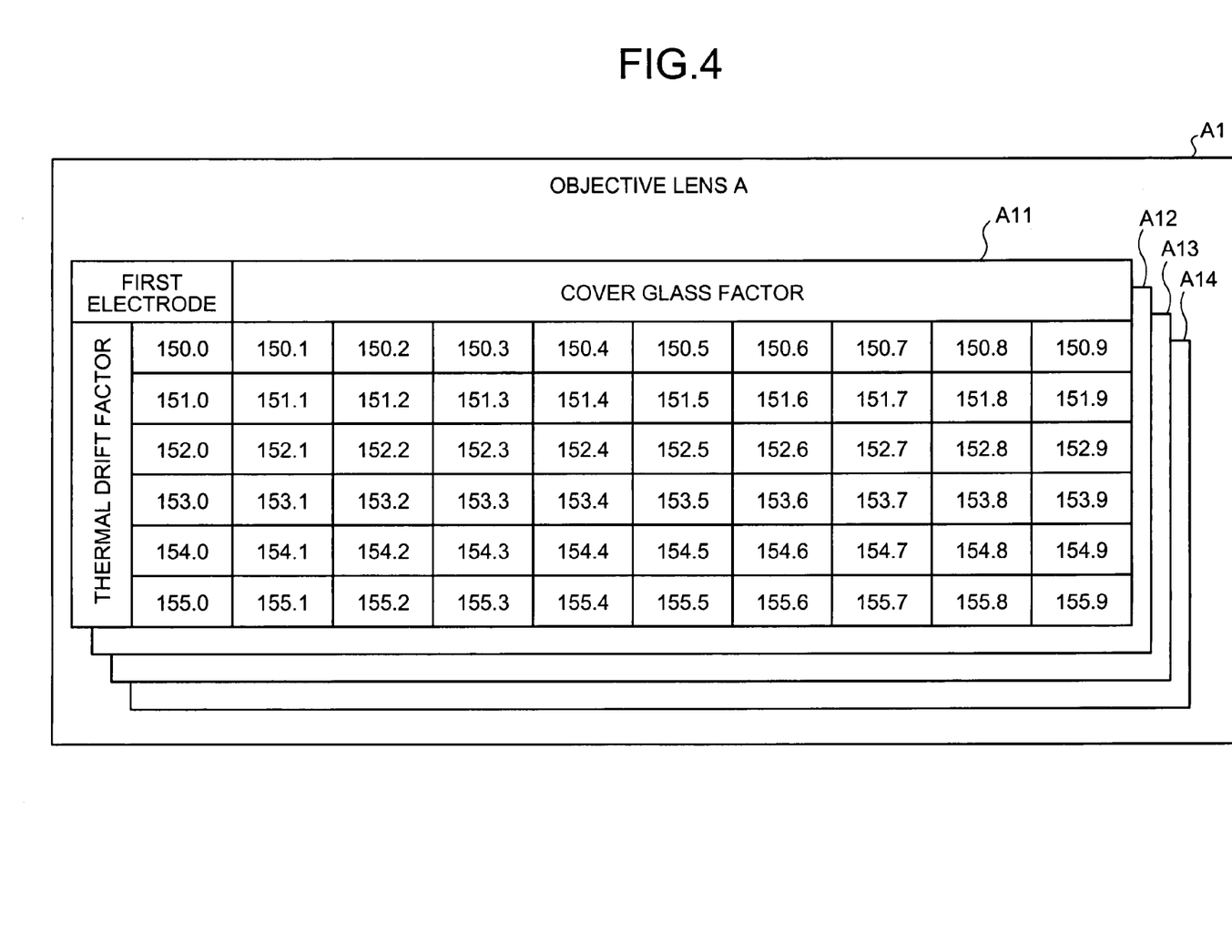
FIG. 4 shows detailed contents of an objective lens table according to the first embodiment of the present invention.

Here, detailed contents of an objective lens table A1 will be explained with reference to FIG. 4. When the adaptive mirror 18 is divided into four, thereby having, four electrodes (first to fourth electrodes), the objective lens table A1 has electrode tables A11 to A14 which correspond to four electrodes respectively. In a sheet A11, a plurality of voltage values applied to the first electrode are stored, and voltage values corresponding to the thermal drift factor and voltage values corresponding to the cover glass factor are stored in a matrix format.

The voltage values corresponding to the thermal drift factor are stored in the sheet from 150.0 V to 155.0 V at 1 V intervals. The voltage values corresponding to the cover glass factor are stored from 150.1 V to 155.9 V at 0.1 V intervals. In each of sheets A12 to A14, voltage values are stored in the same format as shown in the sheet A11. However, voltage values in each sheet are not necessarily the same. The voltage values applied to each of the first to fourth electrodes by the controller 21 can be calculated in advance by simulation calculation or the like. It is generally known that the shape of the reflection surface corresponding to the thermal drift factor is a curved surface having a shape which is approximated by a low order function, whereas the shape of the reflection surface corresponding to the cover glass factor is a curved surface having a shape which is approximated by a higher order function. The combination of the thermal drift factor and the cover glass factor provides the shape of the reflection surface expressed by a low order function added to a high order function. Consequently, the correction table 22 in which such a combination is stored in advance enables handling of various changes in a focal position and an aberration.

The number of electrodes of the adaptive mirror 18 is not limited to four. However, it is necessary to prepare the same number of electrode tables as electrodes of the adaptive mirror 18 to be used.

In the first embodiment, when an out-of-focus blurred image is obtained, the controller 21 selects the voltage patterns stored in the correction table 22, and applies them sequentially to the adaptive mirror 18, to perform quick and secure corrections of the focal position and aberration.

In the first embodiment, when the light volume received by the CCD camera 20 is maximum, the corrections of the focal position and aberration end. Alternatively, the corrections of the focal position and aberration may end when the light volume received by the CCD camera 20 reaches a predetermined value. The CCD camera 20 may be replaced by an optical receiver such as an optical line sensor and a photo detector. If an observation using an incident-light illumination or fluorescence is desired, the light source of the illuminating light should be installed so that the adaptive mirror 18 is in front of the light source (closer side to the CCD camera 20 than to the adaptive mirror 18 in FIG. 1) and thus the illuminating light passes through the adaptive mirror 18.

In the first embodiment, the voltage pattern corresponding to the cover glass factor is selected after the selection of the voltage pattern corresponding to the thermal drift factor. Alternatively, all voltage patterns may be sequentially selected, regardless of the differentiation between the thermal drift factor and the cover glass factor.

An optical microscope according to a second embodiment of the present invention will next be described. In the first embodiment, the corrections of the focal position and aberration are conducted by using the adaptive mirror 18 in the optical microscope 1 categorized as a transmitting illumination type. On the other hand, in the second embodiment, corrections of the focal position and aberration are conducted by using an adaptive mirror in an optical microscope categorized as a confocal scanning type.

Figure 5:
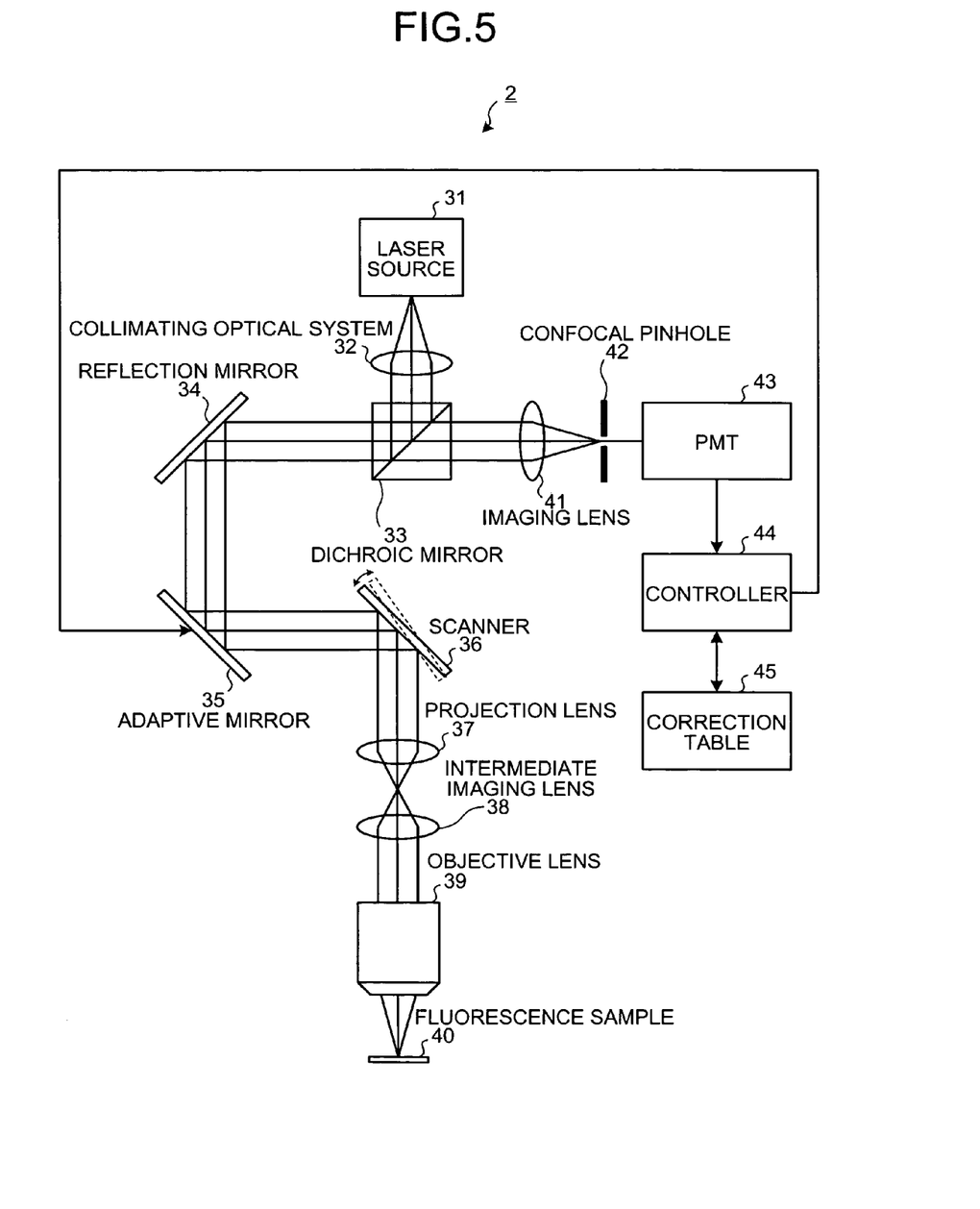
FIG. 5 is a block diagram showing a schematic structure of an optical microscope according to a second embodiment of the present invention.

FIG. 5 is a block diagram showing a schematic structure of the optical microscope 2 according to the second embodiment. As shown in FIG. 5, the optical microscope 2 includes a laser source 31 that emits a laser beam; a collimating optical system 32 that converts the laser beam to a parallel light; a dichroic mirror 33 that reflects the parallel-converted laser beam; a reflection mirror 34 that reflects the laser beam reflected by the dichroic mirror 33; an adaptive mirror 35 that variably forms its reflection surface to reflect the laser beam reflected by the reflection mirror; a scanner 36 that reflects the laser beam reflected by the adaptive mirror 35 into a fluorescence sample 40, thereby to scan the fluorescence sample 40; a projection lens 37 that focuses the irradiating laser beam from the scanner 36; an intermediate imaging lens 38 that converts the laser beam focused by the projection lens 37 to a parallel light; an objective lens 39 that focuses the laser beam parallel-converted by the intermediate imaging lens 38 on the fluorescence sample 40; an imaging lens 41 that focuses fluorescence emitted by the fluorescence sample 40; a confocal pinhole 42 that is located in a conjugating position with a focal position of the objective lens 39; a photo-multiplier tube (PMT) 43 that performs a photoelectric conversion of fluorescence passed through the confocal pinhole 42; a controller 44 that obtains a fluorescence image of the fluorescence sample 40 using an electrical current converted by the PMT 43, and controls a shape of the reflection surface of the adaptive mirror 35; and a correction table 45 that stores a plurality of voltage patterns to be applied to the adaptive mirror 35.

In this confocal scanning optical microscope 2, when a thermal drift occurs due to a heat generation of the laser source 31 or a power supply (not shown) or the like, or when the thickness of the cover glass (not shown) covering the fluorescence sample 40 is different from that of a standard cover glass, the controller 44 obtains an out-of-focus blurred fluorescence image.

When such an out-of-focus blurred fluorescence image is obtained, the controller 44 applies the voltage pattern stored in the correction table 45 to the adaptive mirror 35 sequentially. The controller 44 then varies the shape of the reflection surface of the adaptive mirror 35 to perform corrections of the focal position and aberration based on the light volume of the obtained fluorescence image. In other words, the controller 44 corrects the focal position and aberration by applying to the adaptive mirror 35 the voltage pattern where maximum light volume is obtained.

Figure 6:
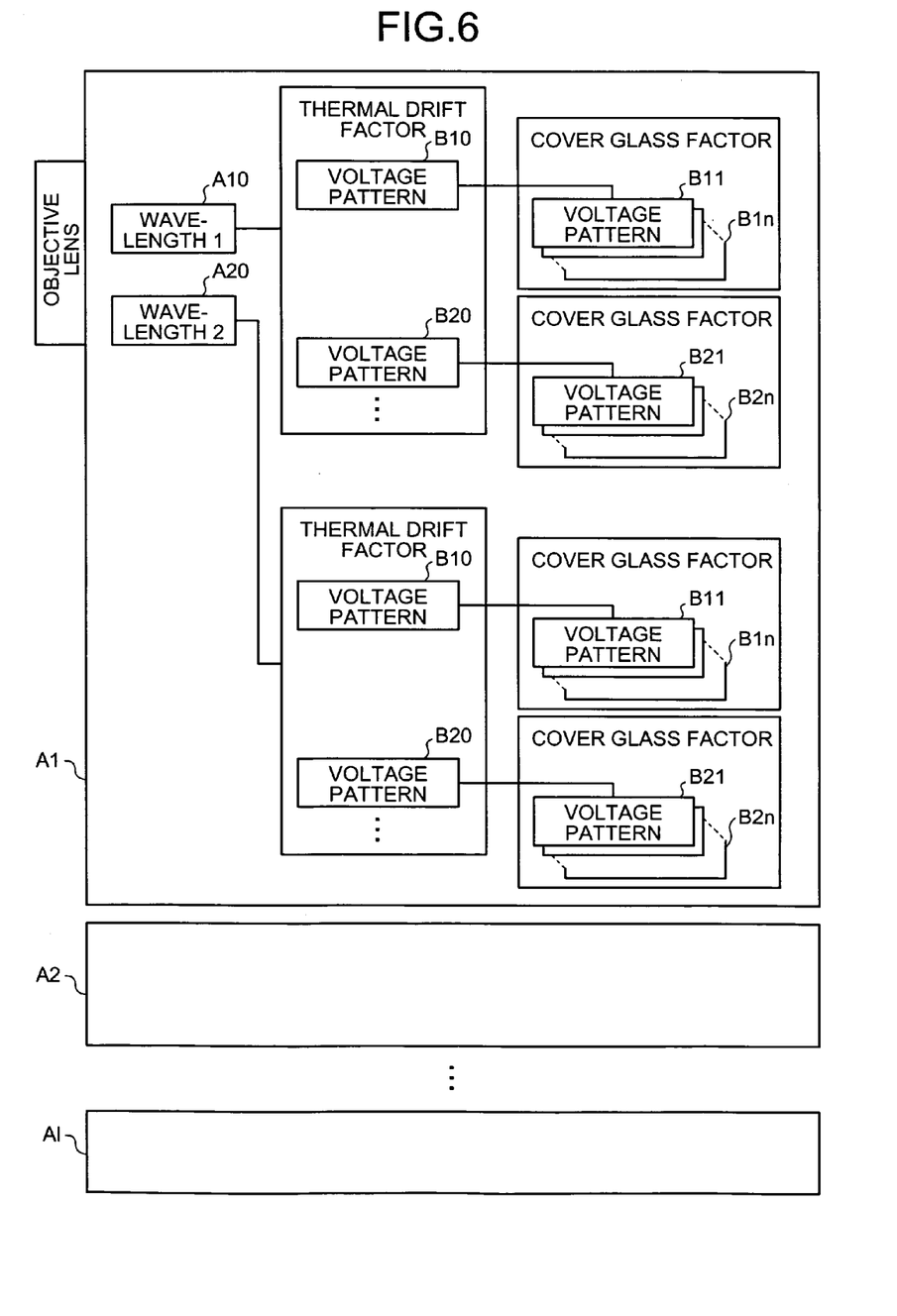
FIG. 6 is a schematic diagram showing a table structure stored in a correction table according to the second embodiment of the present invention.

In the second embodiment, the adaptive mirror 35 and the correction table 45 are used in the confocal scanning optical microscope 2 to correct the focal position and aberration. The correction table 45, as shown in FIG. 6, may have a structure in which voltage patterns corresponding to the laser wavelength of the laser source 31 is added to the correction table 22 described in the first embodiment. Such a structure allows a correction of an aberration due to a laser wavelength factor.

Figure 7:
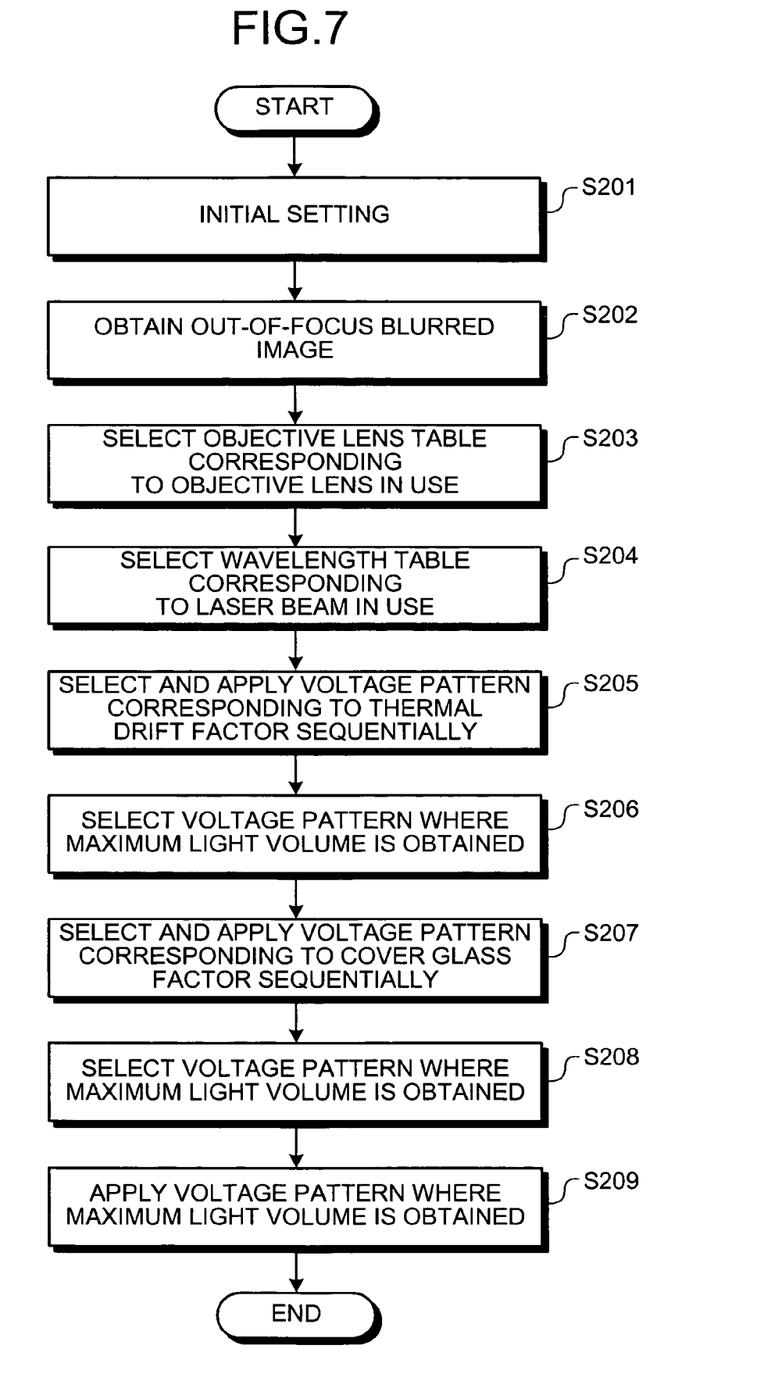
FIG. 7 is a flowchart showing an operation procedure for correction of a focal position and an aberration according to the second embodiment of the present invention

FIG. 7 is a flowchart showing an operation procedure performed by the controller 44. The operation procedure of the controller 44 (steps S201 to S203) corresponds to the operation procedure described in the first embodiment (steps S101 to S103). After these steps, the controller 44 selects a wavelength table corresponding to the laser beam in use (step S204). Following operation procedure after step 204 (steps S205 to S209) corresponds to the operation procedure described in the first embodiment (steps S104 to S108).

In the first and second embodiments, the controller (21, 44) is configured to apply to the adaptive mirror (18, 35) the voltage patterns stored in the correction table (22, 45), based on the light volume of the obtained image. Alternatively, in each of the first and the second embodiments, the voltage pattern may be applied to the adaptive mirror (18, 35) based on one of an electric signal and an electric current output by the CCD camera 20 or the PTM 43, without involving the controller (21, 44).

With such a simple structure, quick and secure corrections of at least one of the focal position and the aberration can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical microscope, comprising:
   a light source which irradiates a sample with an illuminating light;
   a mirror which has a variable reflection surface for reflecting the illuminating light;
   a correction table which stores plural data of plural shapes of the reflection surface which correspond to changes in a focal position and an aberration;
   an optical receiver which receives light emitted by the sample; and
   a controller which selects, from the plural data stored in the correction table, data of one of the shapes of the reflection surface that is suitable for correcting the focal position and the aberration, and which controls the mirror so that the reflection surface forms the shape corresponding to the selected data;
   wherein the controller controls the mirror so that the reflection surface sequentially forms a plurality of the plural shapes corresponding to the plural data stored in the correction table and the controller selects the data of the one of the shapes formed by the reflection surface that causes an amount of the light received by the optical receiver to reach a maximum.

2. The optical microscope according to claim 1, further comprising a plurality of objective lenses which focus the illuminating light on the sample, wherein the correction table stores plural data of plural shapes of the reflection surface for each of the objective lenses.

3. The optical microscope according claim 1, wherein the light source is operable to irradiate the illuminating light in a plurality of wavelengths, and the correction table stores plural data of plural shapes of the reflection surface for each of the wavelengths.

4. The optical microscope according to claim 1, wherein the correction table stores plural data of plural shapes of the reflection surface for each of a plurality of thermal drift factors in the optical microscope.

5. The optical microscope according to claim 1, wherein the correction table stores plural data of plural shapes of the reflection surface for each of a plurality of cover glass thicknesses.

6. The optical microscope according to claim 1, wherein the mirror comprises an adaptive mirror and the reflection surface thereof is variable depending on a value of a voltage applied to the adaptive mirror.

7. The optical microscope according to claim 6, wherein the plural data stored by the correction table comprises data of values of the voltage to be applied to the adaptive mirror.

8. The optical microscope according to claim 1, wherein the controller determines that the data of the one of the shapes formed by the reflection surface that causes the amount of the light received by the optical receiver to reach a maximum corresponds to an optimal shape of the reflection surface for correcting the focal position and the aberration.

9. An optical microscope comprising:
   a light source which irradiates a sample with an illuminating light;
   a mirror which has a variable reflection surface for reflecting the illuminating light;
   a correction table which stores plural data of plural shapes of the reflection surface which correspond to changes in a focal position and an aberration; and
   a controller which selects, from the plural data stored in the correction table, data of one of the shapes of the reflection surface that is suitable for correcting the focal position and the aberration, and which controls the mirror so that the reflection surface forms the shape corresponding to the selected data;

wherein the correction table stores data of a first shape of the reflection surface for correction of the focal position, and data of a second shape of the reflection surface for correction of the aberration, and the first and second shapes are combined to form the shape suitable for correcting the focal position and the aberration.

10. The optical microscope according to claim 9, wherein the first shape comprises a curved surface approximated by a low order function, and the second shape comprises a curved surface approximated by a high order function.

11. The optical microscope according to claim 10, wherein the shape suitable for correcting the focal position and the aberration comprises a curved surface which is approximated by adding the high order function to the low order function.

12. The optical microscope according to claim 9, further comprising an optical receiver which receives light emitted by the sample, wherein the controller controls the mirror so that the reflection surface sequentially forms a plurality of the plural shapes corresponding to the plural data stored in the correction table and the controller selects the data of the one of the shapes formed by the reflection surface that causes an amount of the light received by the optical receiver to reach a maximum.

13. The optical microscope according to claim 12, wherein the controller determines that the data of the one of the shapes formed by the reflection surface that causes the amount of the light received by the optical receiver to reach a maximum corresponds to an optimal shape of the reflection surface for correcting the focal position and the aberration.

14. The optical microscope according to claim 9, further comprising a plurality of objective lenses which focus the illuminating light on the sample, wherein the correction table stores plural data of plural shapes of the reflection surface for each of the objective lenses.

15. The optical microscope according claim 9, wherein the light source is operable to irradiate the illuminating light in a plurality of wavelengths, and the correction table stores plural data of plural shapes of the reflection surface for each of the wavelengths.

16. The optical microscope according to claim 9, wherein the correction table stores plural data of plural shapes of the reflection surface for each of a plurality of thermal drift factors in the optical microscope.

17. The optical microscope according to claim 9, wherein the correction table stores plural data of plural shapes of the reflection surface for each of a plurality of cover glass thicknesses.

18. The optical microscope according to claim 9, wherein the mirror comprises an adaptive mirror and the reflection surface thereof is variable depending on a value of a voltage applied to the adaptive mirror.

19. The optical microscope according to claim 18, wherein the plural data stored by the correction table comprises data of values of the voltage to be applied to the adaptive mirror.

* * * * *